United States Patent [19]

Nishiyama

[11] Patent Number: 4,511,246

[45] Date of Patent: Apr. 16, 1985

[54] SIZE DETECTING DEVICE OF A COPY DOCUMENT SUITABLE FOR ELECTROPHOTOGRAPHIC COPYING MACHINE

[75] Inventor: Haruo Nishiyama, Nara, Japan

[73] Assignee: Sharp Kabushiki Kaisha, Osaka, Japan

[21] Appl. No.: 594,729

[22] Filed: Mar. 29, 1984

[30] Foreign Application Priority Data

Apr. 20, 1983 [JP] Japan .............................. 58-60019[U]

[51] Int. Cl.[3] ....................... G03B 27/62; G03G 15/00

[52] U.S. Cl. .................................. 355/75; 355/14 SH

[58] Field of Search ................ 355/41, 61, 75, 14 SH; 250/557, 560

[56] References Cited

U.S. PATENT DOCUMENTS 4,338,020 7/1982 Yukawa et al. .................. 355/75 X

*Primary Examiner*—John Gonzales
*Assistant Examiner*—Della J. Rutledge
*Attorney, Agent, or Firm*—Birch, Stewart, Kolasch & Birch

[57] ABSTRACT

An electrophotographic copying machine comprising a device for detecting the size of a copy document on a document table. The device includes a light receiving element which is responsive to the positioning of a copy document on a document table for providing document size signals. A control circuit is responsive to the document size signals for detecting the size of the copy document.

10 Claims, 6 Drawing Figures

SIZE DETECTING DEVICE OF A COPY DOCUMENT SUITABLE FOR ELECTROPHOTOGRAPHIC COPYING MACHINE

BACKGROUND OF THE INVENTION

The present invention relates to an electrophotographic copying machine and, more particularly, to a device for detecting the size of a copy document on a document table for an electrophotographic copying machine.

An electrophotographic copying machine produces an electrostatic latent image on an optical-sensitive member. The latent image corresponds to an image on a copy document such as a manuscript or book to be copied. Toner particles are electrically adhered to the latent image, so that the latent image becomes visible to form a toner image.

The toner image is transferred onto a copy paper via a transference charger. Depending upon the size of the copy document, the size of the copy paper should be selected. To properly select the copy paper size, some sensors must be provided adjacent the document table for detecting the size of the copy document.

Conventionally, pairs of document size detecting elements are provided each of which comprises a light emitting element and a light receiving element. The number of said size detecting elements correspond to the number of the kinds of copy papers, and the sizes of the papers to be detected. The light emitting element is positioned on the document cover which is pivotably mounted on the document table. The light receiving element is positioned beneath a document table plate. When a specific size copy document is positioned on the document table and the document cover is closed to cover the copy document on the document table plate, the copy document interrupts light from the light emitting element to the light. By detecting the light receiving element which is not received by the light receiving element, the specific size of the copy document can be detected.

In the above conventional device, it is difficult to detect the specific size of the copy document when the copy document is fairly transparent, so that the S/N ratio of the light receiving element is too poor to correctly detect the particular size of the copy document. Further, the light emitting element or the light receiving element must be positioned on the document cover, so that careful consideration must be taken for problems in wiring the element at the document cover which must be pivotably activated. The document cover must be closed to cover the copy document on the document table.

Otherwise, both the light emitting element and the light receiving element are positioned beneath the document table. When a specific size copy document is positioned on the document table plate, light from the light emitting element is reflected by the document, and the reflected light is received by the light receiving element, so that the specific size of the copy document can be detected. In this device, neither the light emitting element nor the light receiving element is positioned on the document cover, so that the problems in wiring the element at the document cover which must be pivotably activated, can be solved. Further, the size of the copy document can be detected when the document cover is opened.

However, because the light receiving element receives the light reflected by the copy document, in case where the document cover coveres the copy document on the document table plate, it may be difficult to decipher the copy document from the copy document cover and, further, the presence of the dark color copy document cannot be detected, so that erroneous detection of the size of the copy document cannot be avoided.

SUMMARY OF THE INVENTION

Accordingly, it is an object of the present invention to provide an improved device for detecting the size of a copy document on a document table plate.

It is another object of the present invention to provide an improved device for detecting the size of a copy document on a document table based on the difference between the outputs of light receiving elements.

It is a further object of the present invention to provide an improved electrophotographic copying machine comprising a device for detecting the size of a copy document on a document table based on the difference between the outputs of light receiving elements.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to the present invention, a detecting device for detecting the size of a copy document for an electrophotographic copying machine comprises a document table means on which the copy document is placed, document cover means pivotally provided on the document and table means to cover the copy document, sensor means for sensing the size of the copy document on the document table means. The copy document is subjected to optical scanning, and the sensor means comprises a pair of light receiving elements for receiving light and a light emitting element for emitting the light. Reflecting means are pivotably provided on the document table means to be separately raised up, will the light emitting element of the sensor means emitting light toward the reflecting means. The light receiving element of the sensor means receives light reflected by the reflecting means, and detection means responsive to the output of the light receiving element of the sensor means are provided for detecting the size of the copy document.

The light receiving element is a photodiode responsive to the incident light for generating a voltage, and the light emitting element is a light emitting diode.

The detection means comprises an operational amplifier means and a comparator means, and also, the detection means may be a logic circuit.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE INVENTION

Figure 1:
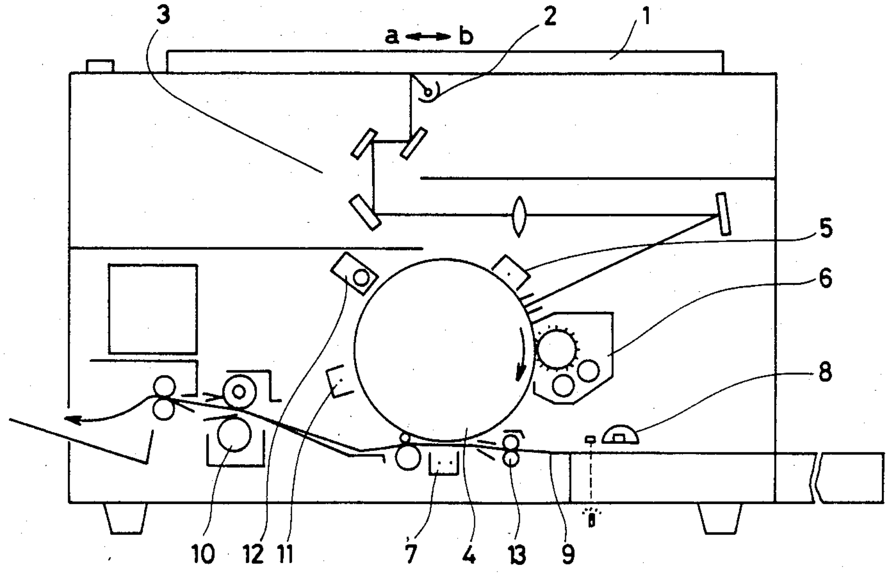
FIG. 1 show a sectional view of an electrophotographic copying machine according to the present invention.

FIG. 1 shows a sectional view of an electrophotographic copying machine of the present invention. A type of electrophotographic copying machine for reciprocating a document table for carrying a copy document such as a manuscript or book is shown. However, it should be noted that the present invention can be applied to other types of electrophotographic copying machines comprising part of an optical scanning system including lenses and mirrors, said part being moved along the document table.

The electrophotographic copying machine of FIG. 1 comprises a document table 1, a light source 2, an optical system 3, an optical-sensitive member 4, a pre-charger 5, a developing section 6, a transference charger 7, a paper pick-up roller 8 and a pair of paper supply rollers 13 for a paper 9, an image fixing device 10, a charge-removal charger 11, and a cleaner 12.

The document table 1 is positioned at the top of the copying machine. The table 1 can be reciprocated in the directions a and b. On the table 1, a copy document such as a manuscript or book is disposed to which light is projected by the light source 2. The optical system 3 is used to focus a reflected image from the object onto the optical-sensitive member 4. The optical system 3 comprises lenses and mirrors for this purposes.

The optical scanning system 3 is fixed while the table 1 is moved. Alternatively, it may be possible that part of the lenses and the mirrors forming the optical scanning system 3 may be moved while the table 1 is fixed.

The optical-sensitive member 4 is formed around a drum. The pre-charger 5 is provided for uniformly pre-charging the optical-sensitive member 4 before the member 4 receives the reflected image.

Responsive to the reflected light image from the copy document, an electrostatic latent image is formed on the optical-sensitive member 4. The developing section 6 is provided for changing the latent image into the visible toner image. The transference charger 7 is provided for electrostatically transferring the toner image upon the paper 9 which is picked up by the paper pick-up roller 8. The image fixing device 10 is provided for fixing the toner image on the paper 9, so that the image on the copy document is copied on the paper 9.

After the toner image is transferred on the paper 9, the remaining charges on the optical-sensitive member 4 are removed by the charge-removal charger 11. The cleaner 12 is provided for cleaning the toner particles remaining on the optical-sensitive member 4.

Responsive to a paper pick-up signal generated in response to the generation of a copy start signal, the paper pick-up roller 8 is rotated at a full turn, so that a single sheet of the paper 9 is picked up. The picked-up paper 8 stops at the position of the pair of paper supply rollers 13. This is because the leading edge of the latent image on the optical-sensitive member 4 must correspond to the leading edge of the picked-up paper 9. Responsive to a position detection signal developed at the timing when the document plate 1 is on the way in the light exposure direction b, the pair of paper supply rollers 13 are rotated to start the supply of the paper 9.

A attention is now directed to a preferred embodiment of the present invention as shown in FIGS. 2–6.

Figure 2:
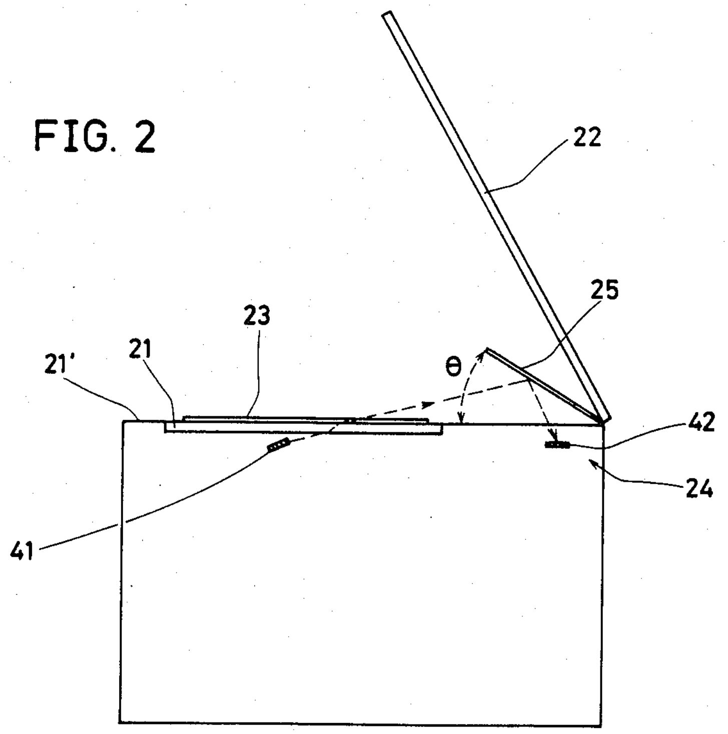
FIG. 2 shows a sectional view of a size detecting device of a copy document according to an embodiment of the present invention.
Figure 3:
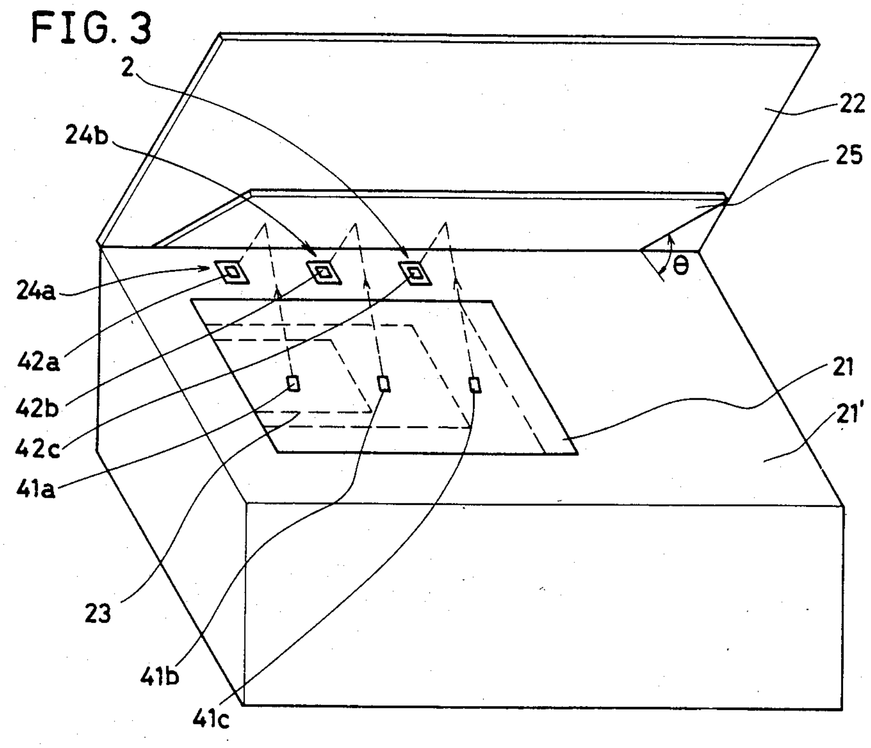
FIG. 3 shows a perspective view of FIG. 2.

FIGS. 2 and 3 show a sectional view respectively and a perspective view of a size detecting device of a copy document according to the preferred embodiment of the present invention, Each sensor 24 as used herein comprises as a pair, a light emitting element 41 and a light receiving element 42. The sensor 24 as shown in FIG. 2 designates sensors 24*a*, 24*b*, and 24*c* as shown in FIG. 3. The light emitting element 41 designates light emitting elements 41*a*, 41*b*, and 41*c*. The light receiving element 42 designates light receiving elements 42*a*, 42*b*, and 42*c*.

The device comprises at least one, preferably, three sensors 24 (24*a*, 24*b*, and 24*c*), a document table plate 21, a document table 21′, a document cover 22, and a reflector 25. A copy document 23 is disposed on the document table plate 21 of the document plate 21′.

As FIGS. 2 and 3 show, the document table 21′ is positioned at the top of the copying machine. The document table plate 21 is a transparent glass plate, and is disposed on the document table 21′. The document cover 22 is pivotably provided on the end of the document table 21′ to cover the copy document 23 to be copied.

The sensors 24 detect the specific size of the copy document 23. Each of the sensors 24 includes a light emitting element 41 such as a light emitting diode (LED), and a light receiving element 42 such as a photodiode, respectively. The light receiving element 42 shows a directivity so as not to scarcely produce a cross talk.

The reflector 25 is separately inclined and pivotably moved on the document table 21′, and is opened and closed together with the operation of the document cover 22. The reflector 25 in contact with the document table 21′ does not cover the document table plate 21. Light from the light emitting element 41 is reflected by the reflector 25, and the reflected light is received by the light receiving element 42. Although the reflector 25 is operated in succession in connection with the operation of the document cover 22, the reflector 25 is maintained at the angle of theta degrees when the document cover 22 is opened more than the angle of theta degrees. When the document cover 22 is closed to cover the copy document 23, the reflector 25 is maintained at the angle of theta degrees if the document cover 22 is not closed beyond this predetermined angle. If the document cover 22 is closed more than the predetermined angle, the reflector 25 is closed with the document cover 22.

Each of the sensors 24 is disposed so that light form the light emitting element 41 is passed through the document table plate 21 and is reflected by the reflector 25, and the reflected light is received by the light receiving element 42. Accordingly, the sensors 24 (24*a*, 24*b*, and 24*c*) are positioned under the document table 21′. For example, the light emitting elements 41 (41*a*, 42*b*, and 41*c*) of the sensors 24 (24*a*, 24*b*, and 24*c*) are obliquely positioned in connection with the surface of the document plate 21, and the light receiving elements 42 (42*a*, 42*b*, and 42*c*) of the sensors 24 (24*a*, 24*b*, and 24*c*) are positioned so that the receiving element is off from the document table plate 21, so that the sensors 24 cannot receive the document scanning light from the light source and reflected by the copy document 23.

The light emitting elements 41 of the sensors 24 are aligned along the center line of the copy area. The light receiving elements 42 are aligned along the end of the document table 21'.

Figure 4:
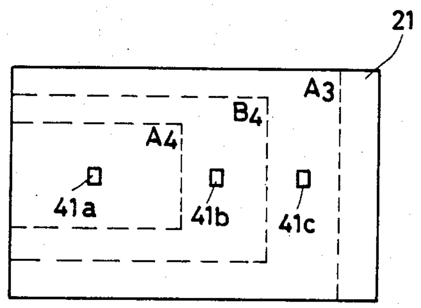
FIG. 4 shows a plan view of a document table plate.

As FIG. 4 shows, the copy document 23 is positioned so that the bottom side of the copy document 23 is in contact with the bottom side of a copy area of the plate 21. The top of the document 23 should be positioned at the top side of each of the copy areas.

With reference to FIG. 3, each of the sensors 24 (24*a*, 24*b*, or 24*c*) is directed to detect each of the copy document sizes. More particularly, a sensor 24*a* is disposed at the position that an A4 size paper can interrupt the light from the light emitting element 41*a* to the light receiving element 42*a*. A sensor 24*b* is disposed at the position that a B4 size copy document 23 can interrupt the light from the light emitting element 41*b* to the light receiving element 42*b* and that the A4 size copy document or smaller size document 23 cannot interrupt the light from the light emitting element 42*b* to the light receiving element 42*b*. A sensor 24*c* is disposed at the position that an A3 size copy document 23 can interrupt the light from the light emitting element 41*c* to the light receiving element 42*c* and that the B4 size copy document or smaller size document 23 cannot interrupt the light from the light emitting element 41*c* to the light receiving element 42*c*.

Figure 5:
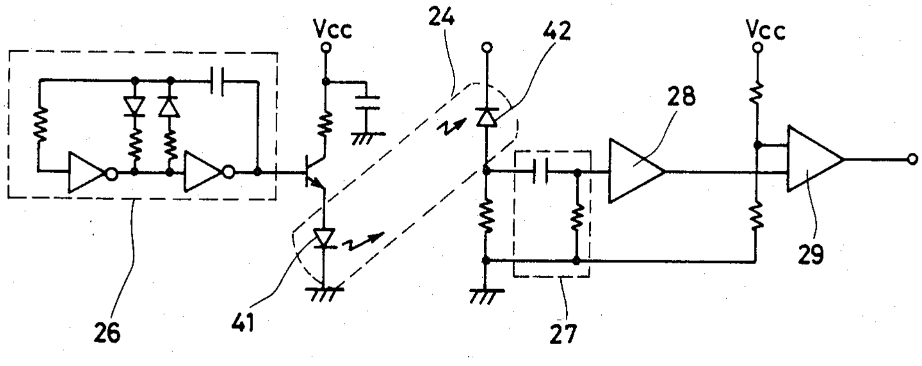
FIG. 5 shows a lying detecting circuit of a copy document for the preferred embodiment of the present invention.

When the copy document 23 is positioned onto the document table plate 21, the presence of the copy document 23 can be detected by a presence detecting circuit of the copy document 23 as follows. FIG. 5 shows a block diagram of the presence detecting circuit.

While the document cover 22 moves to cover the copy document 23 or, otherwise, a copy start signal is developed by the copying machine in response to a copy start command inputted by the operator when the document cover 22 is opened, the light emitting element 42 of at least one of the sensors 24 is activated to emit light toward the copy document 23. In this time, the reflector 25 is opened at the angle of theta degrees. If the A4 copy document 23 is layered on the document plate 21, the copy document 23 interrupts the light from the light emitting element 41*a* of said sensor 24*a* while the light from the light emitting elements of the other sensors cannot be interrupted by the copy document 23. The light from the light emitting element 41*a* of the sensor 24*a* is reflected or absorbed by the copy document 23, so that the light from this light emitting element 41*a* cannot be incident upon the reflector 25 and the light receiving element 42*a* of the sensor 24*a* cannot receive any light. The condition where the light receiving element 42*a* of the sensor 24*a* does not receive light, means the lying of the copy document 23 onto the document table plate 21, in which the lying detecting circuit of FIG. 5 outputs a low level signal "L" for indicating this situation as an output signal related to the sensor 24*a*.

On the other hand, the light from the light emittting elements 41*b* and 41*c* of the sensor 24*b* and 24*c* are incident upon the reflector 25, so that the reflector 25 reflects the light toward the light receiving elements 42*b* and 42*c* of the sensor 24*b* and 24*c*, respectively. The light receiving elements 42*b* and 42*c* of the sensors 24*b* and 24*c* receives the light from the reflector 25, so that the lying detecting circuit of FIG. 5 outputs a high level signal "H" as related to the sensors 24*b* and 24*c*.

Therefore, the light receiving signal is greatly varied in connection with the absence or presence of the copy document, so that the presence or absence of the copy document is correctly detected.

If the light receiving element 41 has a spread of flux of light, the angle of O degrees of the reflector 25 is extended for reflecting the light.

With reference to FIG. 5, as to each one of the sensors 24*a* to 24*c*, the lying detecting circuit comprises the sensor 24 including the light emitting element 41 and the light receiving element 42, a signal generator 26, differential circuit 27, an amplifier 28, and a comparator 29.

The light emitting element 41 is responsive to the pulse signals from the signal generator 26 for being modulated and emitting the light while the document cover 22 moves to cover the copy document 22. The output of the light receiving element 42 is applied to the amplifier 28 via the differential circuit 27. The output of the amplifier 28 is entered into the minus input terminal of the comparator 29. To the minus input terminal of the comparator 29, a comparative voltage is to be applied. To the plus input terminal of the comparator 29 to which a reference voltage is to applied, a voltage divided by resistors from a power voltage +VCC is applied.

With the help of the circuit of FIG. 5, while the copy document 23 is not disposed on the document table plate 21, the light from the light emitting element 41 is incident upon the light receiving element via the reflector 25. The output of the light receiving element 42 is amplified by the amplifier 28. When the amplified voltage from the amplifier 28 is greater than the reference voltage to the comparator 29, the comparator 29 outputs a high level signal "H".

On the other hand, when the copy document 23 is layered on the plate 21, the light receiving element 42 receives little light, so that the output of the amplifier 28 is smaller than the reference voltage to the comparator 29 and the comparator 29 outputs the low level signal "L". The voltage of the reference voltage is selected so that it is greater than the output of the amplifier 28 when the copy document 23 is not present on the plate 21.

Since the lying detecting circuit of FIG. 5 is provided for the respective sensors 24*a* to 24*c*, the outputs of the comparators 29 as to these respective sensors can indicate the presence or absence of a particular size copy document 23.

After the lying or not information of a particular size copy document 23 is obtained, the respective signal generators 26 stop to activate the light emitting elements 41.

The following TABLE I shows a relation between the copy document sizes and the output levels of the respective comparators 29 of the sensors 24.

TABLE I

| SIZES/SENSOR | 24a | 24b | 24c |
|---|---|---|---|
| A3 | L | L | L |
| B4 | L | L | H |
| A4 | L | H | H |
| SMALLER THAN A4 | H | H | H |

As the TABLE I shows, for example, when the B4 size document 23 is disposed on the document plate 21, the light emitted by the light emitting elements 41*a* and 41*b* of the sensors 24*a* and 24*b* cannot reach the respective light receiving elements 42*a* and 42*b*. The output levels of the comparators 29 of these sensors are "L". The light emitted by the light emitting element 41*c* of the sensor 24*c* can reach the light receiving element 42*c* via the reflector 25. The output level of the comparator 29 of the sensor 24*c* is "H". Therefore, the B4 size copy document 23 is detected.

Figure 6:
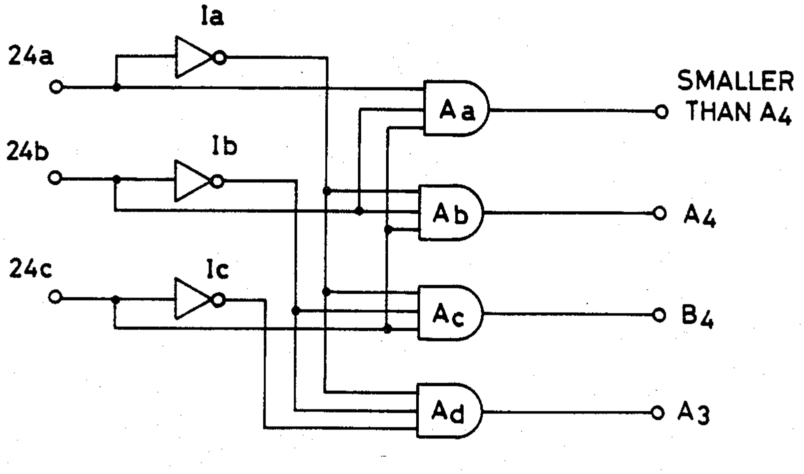
FIG. 6 shows a circuit diagram of a size detecting circuit of a copy document according to the preferred embodiment of the present invention.

FIG. 6 shows a block diagram of a size detecting circuit according to the embodiment of the present invention. The circuit of FIG. 6 comprises the three comparators 29 of the sensors 24*a*–24*c*, three inverters Ia–Ic, and four AND gates Aa–Ad.

With reference to FIG. 6, the outputs of the comparators 29 of the sensors 24*a*–24*d* are entered into the four AND gates Aa–Ad, directly and via the three inverters Ia–Ic. Each of the AND gates Ab–Ad outputs each of the A4, B4, and A3 size detection signals. The AND gate Aa receives the outputs of the comparators 29 of the sensors 24*a*–24*c* via the three inverters Ia–Ic, so that the AND gate Aa outputs a size detection signal of a document size smaller than A4.

Responsive to the outputs of the four AND gates Aa–Ad, a control circuit of the electrophotographic copying machine provides a control signal necessary for pulling in a detected size copy paper. For this purpose, for example, the copying machine has detected some kinds of copy papers which are attached to the copy machine. The control circuit serves to compare the size detection signals of the four AND gates Aa–Ad and attachment paper size detection signals, so that any appropriate size copy papers are pulled into the copying machine, automatically.

In case where the dark color copy document 23 is positioned on the document plate 21, the light receiving element relating to the light emitting element such as an led covered by the document size cannot receive the light from the light emitting element, so that the relating comparator 29 outputs the high level signal for detecting the absence of any copy document in this area.

The reflector 25 is separately provided, so that the light from the light emitting element is received by the light receiving element via the reflector 25 and the size of the copy document correctly detected regardless of the shape of the document cover 22.

The reflector 25 shows a mirror reflection characteristic such as in a mirror, a metal plate, etc.

When several size copy documents are copied, a copy paper corresponding the size of each of the copy documents is selected or pulled by using the size detecting device according to the present invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A detecting device for detecting the size of a copy document for an electrophotographic copying machine comprising:

document table means on which the copy document is placed;

document cover means pivotally provided on the document tables means to cover the copy document;

sensor means for sensing the size of the copy document on the document table means, the copy document being subjected to optical scanning; said sensor means comprising a light receiving element for receiving light and a light emitting element for emitting light;

light reflecting means pivotably disposed between the document table means and the document cover means, whereby the angle of disposition of the light reflecting means can be varied independent of the document cover means,;

said light emitting element of the sensor means emitting light toward the reflecting means and said light receiving element of the sensor means receiving light reflected by the reflecting means; and detection means responsive to the output of the light receiving element of the sensor means for detecting the size of the copy document.

2. The device of claim 1, wherein the light receiving element is a photodiode responsive to the incident light for generating a voltage.

3. The device of claim 1, wherein the light emitting element is a light emitting diode.

4. The device of claim 1, wherein the detection means comprises an operational amplifier means and a comparator means.

5. The device of claim 1, wherein the light receiving element of the sensor means is connected to an operational amplifier means and the output of the operational amplifier is applied to a comparator means.

6. The device of claim 1, wherein the detection means is a logic circuit.

7. The device of claim 1, wherein the light emitting element of the sensor means is tilted toward the document table means so as to provide tilting light toward the document.

8. The detecting device of claim 1, wherein the reflecting means is pivotally rotated with the document cover means at a dihedral angle.

9. The detecting device of claim 1, wherein the light reflecting means is free of color.

10. The detecting device of claim 9, wherein the light reflecting means is a mirror.

* * * * *